United States Patent [19]

Maddock

[11] Patent Number: 5,053,114
[45] Date of Patent: Oct. 1, 1991

[54] CHLORINATOR APPARATUS

[76] Inventor: Robert Maddock, 1417 E. Secretariat Dr., Tempe, Ariz. 85284

[21] Appl. No.: 447,390

[22] Filed: Dec. 7, 1989

[51] Int. Cl.⁵ .......... C25B 9/00; C25B 15/08; B01D 61/00; B01J 8/08

[52] U.S. Cl. .................. 204/252; 204/266; 204/279; 210/195.2; 210/198.1; 210/191; 422/232; 422/239; 422/263; 439/462; 439/589; 439/274

[58] Field of Search ............... 210/644, 205, 474, 754, 210/198.1, 191, 206, 195.2; 204/263, 264, 265-266, 252-258, 242, 272, 279; 422/232, 239, 263; 439/274-275, 461-462, 587, 588

[56] References Cited

U.S. PATENT DOCUMENTS

| | | | |
|---|---|---|---|
| D. 288,348 | 2/1987 | Maddock | D23/207 |
| 2,887,444 | 5/1959 | Lindstaedt | 210/754 X |
| 3,129,172 | 4/1964 | Dickey, Jr. et al. | 210/205 |
| 3,133,877 | 5/1964 | Mixer et al. | 210/754 |
| 3,223,242 | 12/1965 | Murray | 210/139 |
| 3,251,357 | 5/1966 | Williamson | 210/754 X |
| 3,401,116 | 9/1968 | Stanwood | 210/205 X |
| 3,468,796 | 9/1969 | Noll et al. | 210/644 X |
| 3,563,879 | 2/1971 | Richards et al. | 204/272 |
| 3,650,405 | 3/1972 | Morrison | 210/241 |
| 3,702,820 | 11/1972 | Hough | 210/644 X |
| 3,772,193 | 11/1973 | Nelli et al. | 210/205 X |
| 3,975,284 | 8/1976 | Lambert | 210/754 X |
| 4,003,710 | 1/1977 | Fleckenstein et al. | 210/605 X |
| 4,229,272 | 10/1980 | Yates | 204/128 |
| 4,290,873 | 9/1981 | Weaver | 204/228 |
| 4,361,471 | 11/1982 | Kosarek | 204/128 |
| 4,411,759 | 10/1983 | Olivier | 204/260 |
| 4,472,256 | 9/1984 | Hilbig | 204/266 |
| 4,582,586 | 4/1986 | Maddock | 204/278 |
| 4,599,159 | 6/1986 | Hilbig | 204/266 |
| 4,613,415 | 9/1986 | Wreath | 204/98 |
| 4,693,806 | 9/1987 | Tucker | 204/252 |
| 4,744,877 | 5/1988 | Maddock | 204/266 |

OTHER PUBLICATIONS

Affidavit of Gary C. Davidson Sep. 9, 1987.
Memo from Glazer to Hilbig May 17, 1982.

*Primary Examiner*—Donald R. Valentine
*Attorney, Agent, or Firm*—Price, Gess & Ubell

[57] ABSTRACT

A chlorinator employing a vertically tiered arrangement wherein a chassis unit vertically and removably mounts on a lower sodium chamber and contains a cone-shaped structure which depends into the lower chamber and disposes an attached membrane and cathode at angles to the horizontal within said lower chamber. The chassis unit further includes an attached anode within the conical surface, and integral handles and electrical interconnection points. The chassis is rigidly attached to an upper pipe section with which a lid slidably interfits.

26 Claims, 5 Drawing Sheets

CHLORINATOR APPARATUS

BACKGROUND OF THE INVENTION

1. Field of the Invention

The subject invention relates to chlorinator apparatus and, particularly, to an improved chlorinator apparatus employing electrolysis of salt and suitable for providing chlorine gas in quantities sufficient for disinfecting residential swimming pools

2. Description of Related Art

The basic theory of operation for producing chlorine from salt is very old. This process is commonly known as electrolysis, and thus chlorine generators of this type are most often classified and referred to as "electrolic or electrolytic chlorine generators."

Salt is composed of 62% chlorine and 38% sodium. The chlorine can be separated from the salt utilizing the electrolysis process. The process requires two electrodes. One electrode is called an "anode" and is connected to a positive DC electric potential. The other electrode is called a "cathode" and is connected to the negative DC electric potential. This results in a DC electrical current path from the negative cathode to the positive anode.

In order to produce chlorine gas during the electrolysis process, the electrodes are typically placed in adjacent solutions separated by a semipermeable membrane. One of these solutions is a saturated solution of salt. The other solution is tap water, which will become sodium hypochlorite during the process. When a DC electrical potential is placed across the anode and cathode, an electric current begins to flow from the cathode through the membrane to the anode. In only a few seconds, tiny bubbles of chlorine gas begin forming.

In a salt water solution, the chlorine atom has a negative charge as a result of an excess of electrons. The positive potential on the anode attracts the chlorine atoms to it. As they collect, they form tiny bubbles and rise to the surface, releasing chlorine gas. The sodium atoms left in the salt solution have a shortage of electrons and therefore are positively charged. The negative potential on the cathode attracts the positive charged sodium atoms through the semipermeable membrane. Sodium reacts with the water to form sodium hypochlorite and hydrogen. When the potential across the electrodes is increased, the reaction increases. When the potential is removed from the electrodes, the reaction stops. The membrane prevents the two solutions from contacting each other. When the DC potential is reapplied, the reaction resumes.

Chlorinators employing electrolysis of salt (NaCl) to produce chlorine gas have been in existence for some time. However, various problems have existed with their operation and maintenance. The structure of some units requires complete draining and disassembly for repair, making service relatively costly and time consuming. Any effort to remedy such problems must still ensure that current flow is not diminished, prohibiting chlorine formation, that waste materials do not collect in various areas and impede chlorine formation, and that clogging does not occur as salt dissolves. Proper flow of chlorine gas must also be controlled to prevent dangerous situations. In some units chlorine gas can accumulate in the unit or be released to the atmosphere surrounding the unit.

SUMMARY OF THE INVENTION

Accordingly, it is an object of the invention to improve chlorinator apparatus.

It is another object of the invention to provide improved chlorinator apparatus for residential pool application.

It is another object of the invention to provide an improved chlorinator of the kind employing electrolysis of salt.

It is another object of the invention to provide a chlorinator which is easily disassembled for repair and maintenance.

It is another object of the invention to provide an easily assembled and maintained unit, while at the same time providing improved operation by eliminating sources of problems in prior art units.

It is another object of the invention to provide an antidrain valve for use in connection with chlorinating apparatus.

According to the invention: a vertically tiered, nested chlorinator structure is provided wherein a chassis unit mounts on top of a base unit. The base unit contains the water solution. The chassis unit extends a membrane into the base unit and separates an upper salt solution from the lower water solution in the base. A salt containing means nests into the chassis unit. The upper portion of the chassis unit is closed by a lid.

According to another novel feature of the disclosure, the chassis unit is a unitary removable structure featuring an outer periphery which slidably interfits with the base unit and from which depends a funnel-like portion suspending a membrane at an angle to the horizontal. According to a further feature, the chassis unit further integrally mounts an anode and cathode and has integrally formed means for establishing electrical connection thereto, as well as means for supporting the salt container means in spaced apart relation therewith.

According to another novel feature, the salt containing means has a vented, funnel-like lower portion thereon leading to a bottom which funnels upward to conduct chlorine to an escape orifice therein.

According to another novel feature, an electrode connector is provided which attaches directly into the chassis unit and permits connection of exterior leads to interior anode and cathode rods.

According to another novel feature, an antidrain valve is provided, which permits connection of the chlorinator to the drain port of a typical pump.

BRIEF DESCRIPTION OF THE DRAWINGS

The just-summarized invention will now be described in detail in conjunction with the drawings, of which.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art since the generic principles of the present invention have been applied herein specifically to provide chlorinator apparatus of sturdy construction and appearance and particularly suited for ready installation and easy maintenance in residential chlorinator applications.

Figure 1:
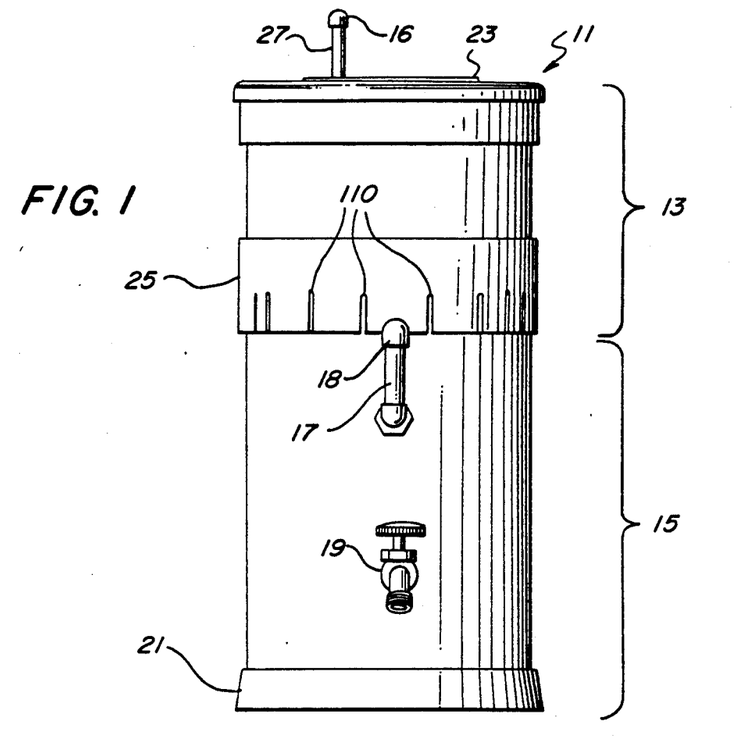
FIG. 1 is a pictorial view of the chlorinator apparatus of the preferred embodiment.

A chlorine generator or chlorinator 11 according to the preferred embodiment is illustrated pictorially in FIG. 1 The chlorine generator 11 includes an upper salt chamber 13 and a lower sodium chamber 15. The upper salt chamber 13 rests upon the lower sodium chamber 15 As will be discussed in greater detail, according to the preferred embodiment, the salt chamber 13 may be simply manually lifted off the lower sodium chamber 15 when the salt in the upper chamber 15 is spent.

Additional external features illustrated in FIG. 1 include a base 21 on which the lower sodium chamber 15 rests, a drain 19, a clear level indicator tube 17, a skirt 25, a measuring rod 27 having a cap 16, and a lid 23 closing the upper salt chamber 13. Power is supplied to electrodes within the chlorinator 11 through an external power supply (not shown), which includes a transformer to transform standard AC power to the DC voltage required for the chlorination process As shown in the cross-sectional drawing of FIG. 2, the lower sodium chamber 15 is configured of a cylindrical polyvinyl chloride (PVC) pipe 28, for example, of 15 inches in diameter. The pipe 28 is glued into an annular notch 29 in the molded PVC base member 21.

Figure 2:
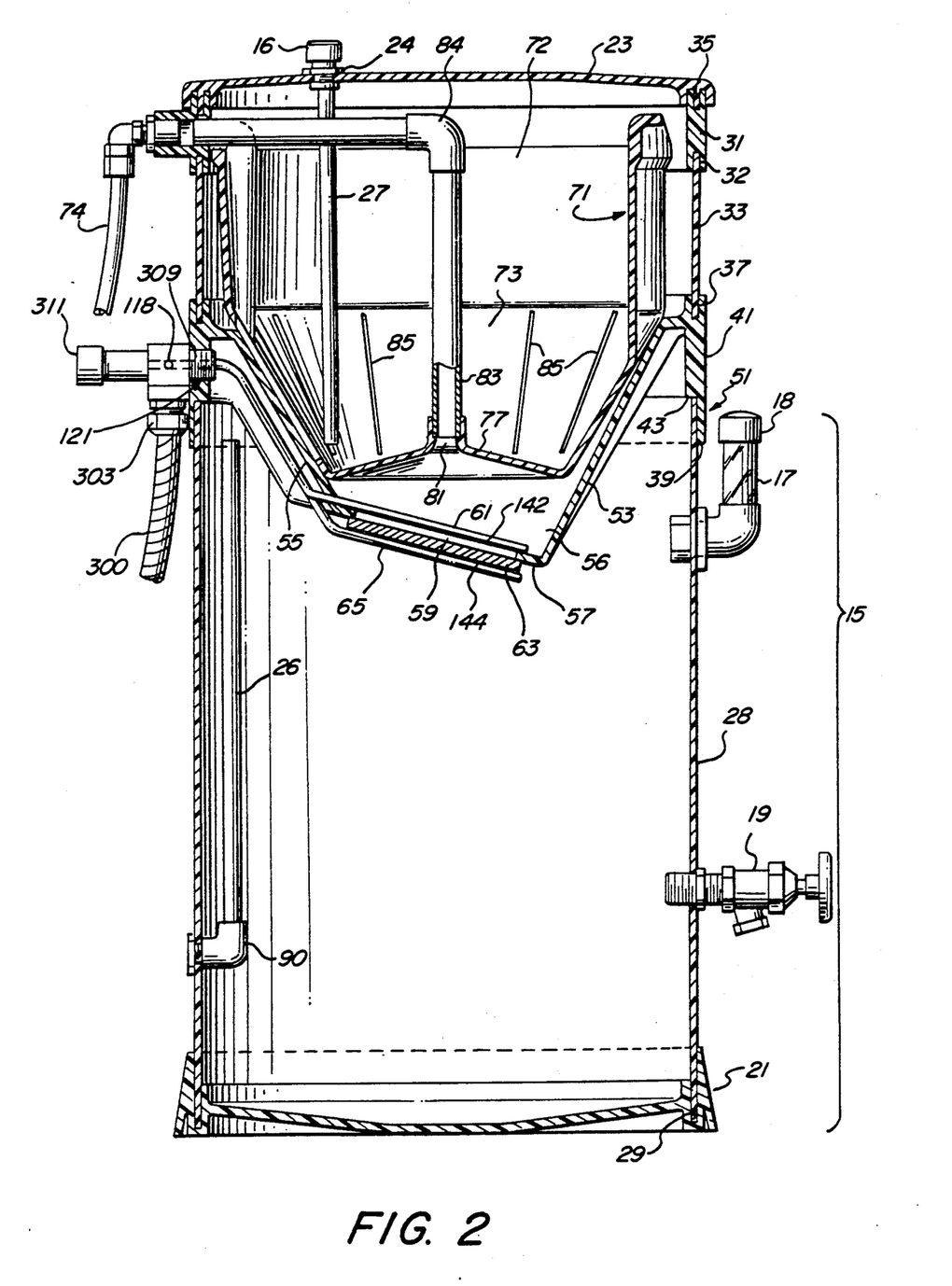
FIG. 2 is a side sectional view of the chlorinator of FIG. 1.

While a facet drain 19 is illustrated attached at the lower end of the pipe 28 in FIG. 2, a direct drain line can be connected at installation. The clear level indicator 17 is attached to the upper end of the pipe 28 and includes a removable cap 18, which permits filling of the lower chamber 15 through the level indicator tube 17. An internal overfill pipe 26 is positioned within the lower chamber 15 to prevent the contents of the lower chamber 15 from overfilling and spilling out of the unit 11.

The upper salt chamber 13 includes an upper flange 31, a cylindrical pipe section 33, and a chassis section 51. The upper flange 31 is generally cylindrical and has a notch 35 therein for receiving the lid 23 in an easily slidably removable, tongue and groove fashion.

The lid 23 is round and almost flat, and has a bushing 24 therein to slidably receive the measuring rod 27 (FIG. 1). The edge of the lid 23 and the notch 35 are designed to mate together in such a way as to block the escape of chlorine gas, while not creating a strong vacuum seal which might cause the lid 23 to be held in place by the suction created by an associated pump.

The upper flange 31 of the upper salt chamber 13 has a lower notch 32 therein in which the upper end of the pipe section 33 is glued. The lower end of the pipe section 33 is glued into an annular notch 37 in the chassis 51.

The chassis 51 includes a lower cylindrical section 39 with an inside diameter just slightly larger than the outside diameter of the lower chamber pipe 28. Directly adjacent the segment 39 is a second generally cylindrical portion 41 of the chassis 51 which forms an edge 43. The edge 43 rests on the top edge of the lower salt chamber pipe 28 such that the upper salt chamber 13 may be removed from the lower sodium chamber 15. Handles 135, 136 (FIG. 4) are provided for that purpose.

The chassis 51 includes first and second angulated sides 53, 55 which form a generally conical, funnel-like cavity or chamber 56 suspended from the generally cylindrical portion 41 within the lower sodium chamber 15. The angulated sides 53, 55 lead to an angulated bottom 57 disposed at an angle to the horizontal. This angle may be such as 15 degrees. The angulated bottom 57 of the chassis 51 has a square opening 59 therein. Across the opening 59 is disposed a membrane element 63. An anode 61 and attached (preferably by resistance welding) mesh collector 142 are disposed adjacent the bottom 57 of the chamber 56 of the chassis 51 across the opening 59. A cathode 65 and attached (preferably resistance welded) perforated collector 144 are disposed adjacent the membrane element 63 within the lower sodium chamber 15. As may be observed in FIG. 2, the cathode 65, collector 144, membrane element 63, and anode 61 are all disposed at substantially the same angle to the horizontal as the bottom 57 of the chassis 51.

The anode elements 61, 142, cathode elements 65, 144, and membrane 63 are each a specially selected material. The cathode elements 65, 142 are alloy 304 stainless steel. The anode elements 61, 144 comprise alloy T1 titanium plated with a ruthinium base, applied commercially by Eltech Systems Corp., Chardon, Ohio. The membrane 63 is made of Nafion TM, a DuPont product, of type #324. The electrodes 61, 65 are both sealed watertight at the point they are attached to the molded body of the chassis 51, preferably through use of respective electrical connection means 301 as shown in connection with FIGS. 4 and 11.

Additionally located within the upper salt chamber 13 is a removable salt basket 71. The salt basket 71 has a generally cylindrical upper section 72 which integrally forms into a generally funnel-shaped lower inner contour 73. The inner contour 73 leads to a bottom surface 77 which slopes upwardly at an angle to the horizontal and leads to a cylindrical discharge orifice 81. Also shown in FIG. 3 are elongated vents 85 uniformly disposed about the circumference of the lower portion 73 of the salt spacer 71.

An exhaust or output pipe 83 is press fit into the exhaust orifice 81 so as to be removable by hand The exhaust pipe 83 provides the outlet through which chlorine $Cl_2$ produced by the apparatus is discharged to cooperating apparatus. A hole 84 is formed in the pipe 83 to pick up chlorine gas from the upper chamber 15 and to prevent creation of suction which would pull liquid into the pipe 83.

Figure 3:
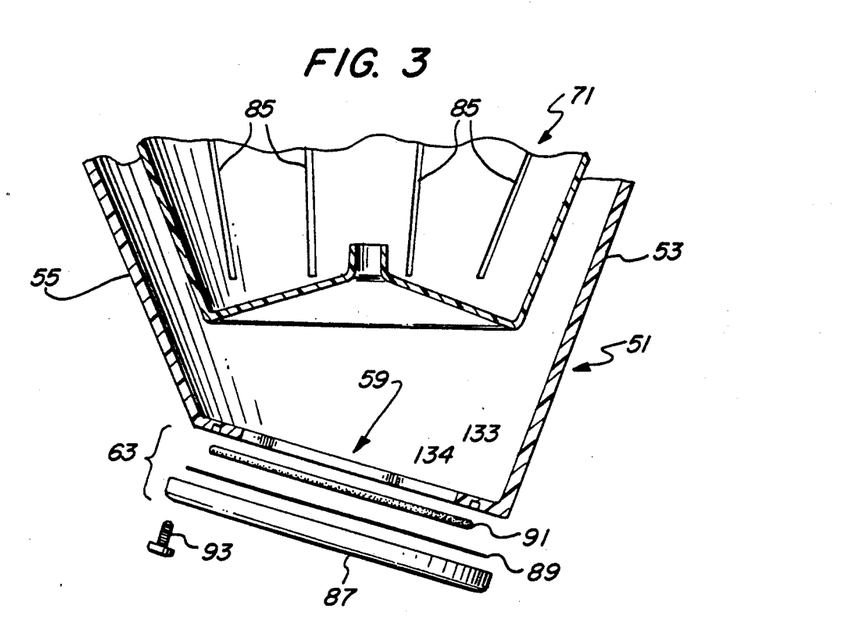
FIG. 3 is a partially expanded side sectional view illustrating membrane attachment according to the preferred embodiment.

Attachment of the membrane element 63 across the opening 59 of the chassis 51 is illustrated in more detail in FIG. 3. According to FIG. 3, the membrane element 63 includes a seal plate 87, a membrane 89, and an O-ring 91 made from Viton ™, a DuPont product. Screws 93, numbering, for example, 8, are used to tighten the seal plate 87 into position, sandwiching the membrane 63 and the O-ring 91 between the seal plate 87 and the chassis 51. The integrity of this seal is important, since a leak will drain the upper chamber 15, overflow the lower chamber 15 and stop chlorine production.

Figure 4:
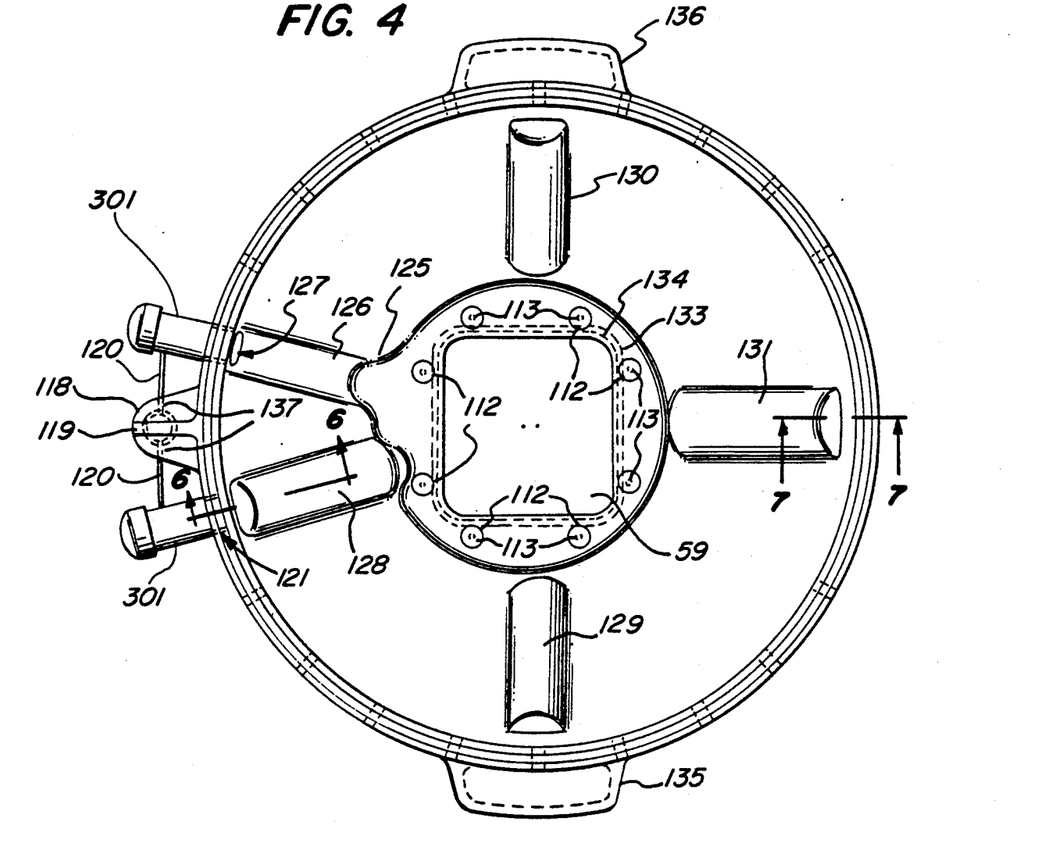
FIG. 4 is a top view of the chassis of FIG. 4.

FIGS. 4 to 8 illustrate the preferred chassis unit 51 in detail. With reference to FIG. 4, looking down into the chassis unit 51, there are located four elongated bumps or crowns 128, 129, 130, 131 and an elongated depression 126 in the otherwise generally conical surface suspended by the generally cylindrical portion 41 of the chassis 51. The conical surface is of a uniform thickness of, e.g., ¼-inch, at all points, including those surfaces comprising the bumps 128, 129, 130, 131 and the depression 126.

The bumps 128, 129, 130, 131 provide surfaces against which the salt basket 71 rests, thus spacing the salt basket 71 away from the remainder of the conical surface of the chassis 51. The bump 128 extends further toward the bottom of the cone than the other bumps 129, 130, 131 for the purpose of accommodating a cathode rod 61 (FIG. 8), which runs under the bump 128 and connects to a square mesh collector plate 142.

The depression 126 leads to an aperture 127 in the conical surface. This aperture 127 receives the anode electrode rod 65 (FIG. 8), which runs down the depression 126 in the conical surface of the chassis 51 and connects to a square, perforated collector plate 144, as hereafter described.

At the bottom 57 of the conical surface of the chassis 51 is formed the substantially square opening 59, which has vertical side walls. Around this opening 59 are located eight bosses 112, in which are drilled blind holes 114 for receiving screws 93, which attach the seal plate 87 of FIG. 3. Dotted lines 133 and 134 identify a groove, wherein the 0-ring 91 of FIG. 3 resides.

Additional chassis features illustrated in FIG. 4 include integral handles 135, 136, which permit lifting the chassis 51, including its anode and cathode rods 65, 61 and attached membrane 89, out of the lower tank 15.

Figure 9:
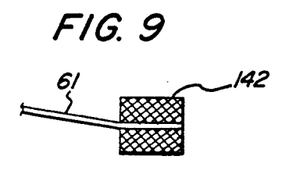
FIG. 9 is a top view of an anode according to the preferred embodiment.
Figure 10:
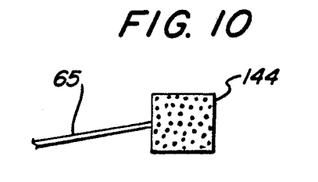
FIG. 10 is a top view of a cathode according to the preferred embodiment.

FIG. 4 further illustrates a housing 118 integrally formed as part of the chassis 51 and having a threaded opening 119 therein for receiving a conduit 300 such as a PVC flexible electrical conduit, e.g., ⅜-inch normal size, from an external control unit attached via a watertight fitting 304 (FIG. 2). Horizontal holes 137 lead into opening 119. Insulated leads 120 exit from these holes and electrically connect to the anode and cathode rods 65, 61 through respective connectors 301 (FIG. 9). The connectors 301 screw into respective threaded openings 121, 127 formed in the chassis unit 51.

Figure 5:
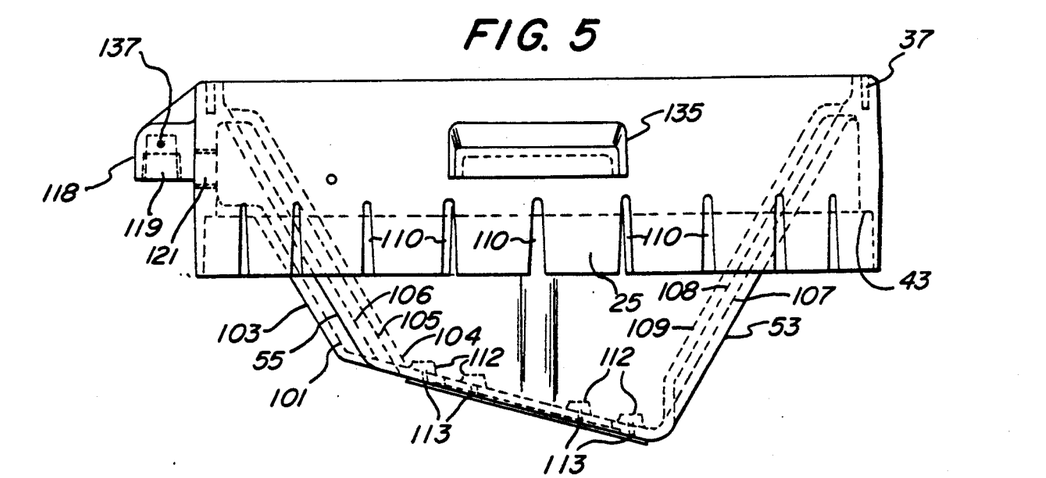
FIG. 5 is a side view of the chassis according to the preferred embodiment.
Figure 6:
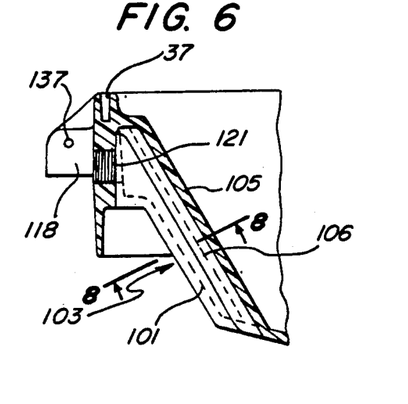
FIG. 6 is a sectional view taken at 6—6 of FIG. 4.
Figure 7:
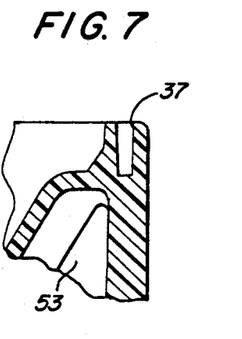
FIG. 7 is a sectional view taken at 7—7 of FIG. 4.

In FIG. 5, numerals 53 and 55 reference the conical sides, which are, for example, each at a 60-degree angle to the horizontal. Side 103 is a protrusion where the conical surface flexes out to form the anode depression 126. Lines 108 and 109 define bump 131, while the width between lines 53 and 107 represents the cone wall thickness. Dashed lines 55 and 106 define the thickness of the cone surface, and dashed lines 104 and 105 define another bump 128.

As shown in FIG. 5, the slots 110 in the chassis skirt 25 extend above edge 43 and, hence, above the top edge of pipe 28. These slots 110 serve as vents for a small amount of hydrogen generated during electrolysis. Additionally, two small holes may be provided in the upper chamber for additional venting. If the level tube 17 is at six o'clock when viewed from the top of the unit, the two vent holes may be ⅛-inch holes angled at 45 degrees and located at the ten and two o'clock positions.

Figure 8:
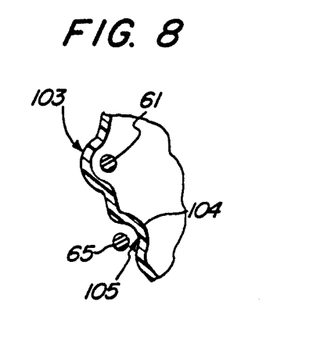
FIG. 8 is a sectional view taken at 8—8 of FIG. 6.

The section of FIG. 8 illustrates the undulating contour provided in a portion of the cone surface to accommodate the electrodes 61, 65.

Except as otherwise indicated, all parts are preferably molded or fabricated from PVC material. This material will withstand the corrosive effects of chlorine gas and endure the weathering attack from the sun and cold indefinitely. Other materials do not have the necessary chemical resistance to withstand the combination of these conditions. All inner and outer PVC wall thicknesses are preferably a minimum of 0.20-inch thick for strength, durability, and safety. There are two joints 32, 37 to assemble during the fabrication of the upper chamber 13. A glue commercially available high in PVC fillers and low in solvents is preferred. A primer is necessary to prepare the joint prior to applying the glue. The integrity of this assembly operation is important to the quality of the upper chamber 13. Failure to do it correctly will result in a leak.

The volume of the lower chamber 15 is proportional to the volume of the salt basket 71 and the upper chamber 13. In order to ensure a long lasting membrane and efficient chlorine production and prevent back migration through the membrane, it is necessary to ensure the sodium hypochlorite solution does not exceed 20% strength. A unit with an undersized lower chamber will not function long.

In operation, when a voltage is applied across the anode 61 and the cathode 65, chlorine gas is generated at the anode 61. The chlorine gas travels upward through the salt basket 71 and up to the exit pipe. The angulation of the membrane at 15 degrees prevents bubbles from forming and collecting under the membrane 63 and blocking current flow. This angle also enables foreign matter that might contaminate the anode 61 and membrane 63 to collect at the side of the anode 61 or membrane 63, rather than on the anode 61 or membrane 63.

As salt is depleted, the molded cone shape of the salt basket 71 causes salt to flow towards the bottom 77 of the basket 71 rather than sticking or clogging at the top of the basket 71. Locating the vertical slots 85 only on the lower half of the salt basket 71 exposes the salt in the bottom 77 of the basket 71 to fresh water first. This causes the salt at the bottom 77 to dissolve first and dissolve completely. The salt at higher levels than falls and begins to dissolve in turn. This dissolution in layers prevents clogging and causes the salt pellets to dissolve completely.

The bottom 77 of the salt basket 71 is in the shape of an inverted cone which spreads out the bottom layer of salt and guides the chlorine bubbles to the entrance of the chlorine exit pipe 83. The chlorine exit pipe 83 attaches to the salt basket bottom 77 on the inside of the basket 71. An orifice 81 in the bottom 77 of the salt basket 71 permits the chlorine gas bubbles to rise up through the salt pellets and be drawn to the exit port 72 and into the apparatus which mixes chlorine with the pool water. The exit pipe arrangement prevents a buildup of chlorine gas in the upper (anode) chamber 13. This makes it possible to gain access to the anode chamber 13 with a minimum of chlorine gas escaping. The exit port 72 is a standard pipe slip joint, which permits any plumbing connection that may be specified using standard commercial plumbing materials. A slip-fit connection into port 72 provides the added convenience of being easily able to test for the existence of a vacuum in the line 74.

The hole 24 and measuring rod 27 (FIG. 1) located therein can be utilized to measure the amount of salt remaining in the salt basket 71 without removing the lid 23. Removing the lid 23 may release some chlorine gas, which could cause great discomfort if inhaled. The measuring rod 27 will go all the way down to the cap 16 if the salt basket 71 is empty. The distance between the cap 16 and the lid 23 is indicative of the amount of salt remaining in the basket 71 underneath the lid 23. The water level can also be checked by inserting and removing the measuring rod 27 and observing the water line on the rod, similar to the way oil is measured by a "dip-stick" in an automobile. The customer may also add water to the upper (anode) chamber 13 though the hole 24 without removing the lid 23 and avoiding the release of any chlorine gas.

It will be observed that the preferred embodiment provides a tiered, nested structure in which each major section: lid 23, chassis 51, salt basket 71, and lower tank 51 is readily removable for inspection and maintenance.

According to this structure, the anode chamber 13 protrudes downward and dips into the cathode solution to establish a current path and electrolysis. This arrangement makes it possible to easily separate the two chambers 13, 15 for access and maintenance. The chassis 51, which is the base for the anode chamber 13, has handles 135, 136 molded into its sides for greater ease in handling and disassembly. The salt basket 71 nests in position inside the anode chamber 13 and is also provided with integrally formed handles and designed to be removable and holding all the salt. This structure permits quick and easy access to the inner workings of the apparatus without special tools, disassembly or wasting salt.

Thus, the molded chassis 51 is a central feature of the unit 11, incorporating a number of functions into its unitary, pressed, molded design. These include the handles 135, 136 for lifting the upper tank 13 off the lower tank 15, vents for the lower chamber, electrode connecting and attaching means, salt basket support, and membrane sealing means.

Figure 11:
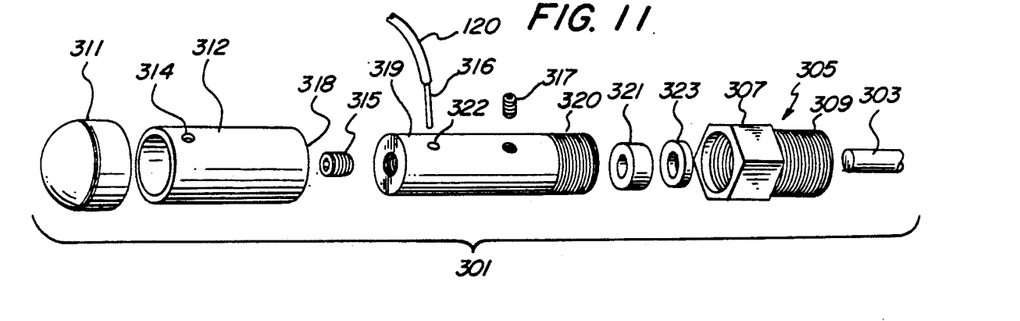
FIG. 11 is a perspective exploded view of an electrode connector according to the preferred embodiment.

The electrodes 61, 65 are preferably attached to external connections via electrode connectors 301, shown in FIG. 11, one connector 301 being used to connect the anode 61, and one connector 301 being used to connect the cathode 65. The electrode 303 (anode 61 or cathode 65) fits into a PVC housing 305 having a hex nut 307 integrally formed at one end adjacent to a threaded portion 309 provided to thread into the openings 121, 127 in chassis 55 of the chlorinator 11.

The connector 301 further includes a PVC end cap 311, which is removably attachable or, alternatively, fixed on one end of a PVC insulator sleeve 312. The remaining components of the electrode 301 comprise a first set screw 315, a second set screw 317, a cylindrical copper body 319 threaded at one end 320, a compression bushing 321, and packing 323 of a chlorine-proof material such as Gortex ™, manufactured by the Gortex Corporation.

Figure 12:
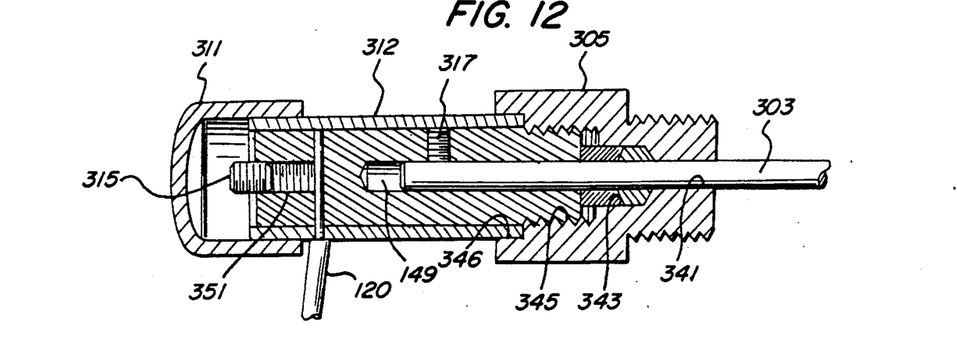
FIG. 12 is a side sectional view of the electrode of FIG. 11 as assembled.

As seen in cross-section in FIG. 12, the housing 307 includes a first cylindrical opening 341 just slightly larger than electrode rod 303, a second concentric cylindrical opening 343 of larger diameter for receiving the bushing 321 and the packing 323, and a concentric cylindrical opening 345 of still larger diameter for receiving the threaded end 347 of the copper body 319. The copper body 319 itself contains a central bore 349 forming a blind hole which closely receives the electrode 303 and conducts it well beyond the point where set screw 317 is located. The copper body 319 contains a second blind hole 351 bored in the opposite end to receive the set screw 315.

Accordingly, the bushing 321 and packing 323 are placed in the first cylindrical opening of the housing about the electrode 303, which is passed through the housing 305 and inserted into the bore of copper body 319. The copper body 319 is screwed into the housing, compressing the bushing 321 and packing 323 to create a seal. Bushing 321 preferably is tapered conically inward on the end which abuts the packing 323 to further facilitate sealing. The set screw 317 is then screwed in to clamp the electrode 303. The insulator sleeve is then placed over the copper body 319 such that its end 318 enters a cylindrical opening 346 in the nut 307 of the housing 305 and such that hole 314 overlies hole 322 of the copper body 319. The lead 120 is then inserted through the holes 314, 322 and clamped in place by tightening the set screw 315. The end cap 311 is then put in place, completing electrical interconnection between the lead 120 and the electrode 303.

The electrode connectors 301 completely insulate and isolate the current carrying components, which protects the copper parts from corrosion. The connectors 301 also seal the electrodes 61, 65 and offer a fast, easy, and inexpensive means to attach the power leads, e.g., 316. No soldering or crimping is required. Connector resistance is also reduced over prior art designs.

Figures 13, 14, 15:
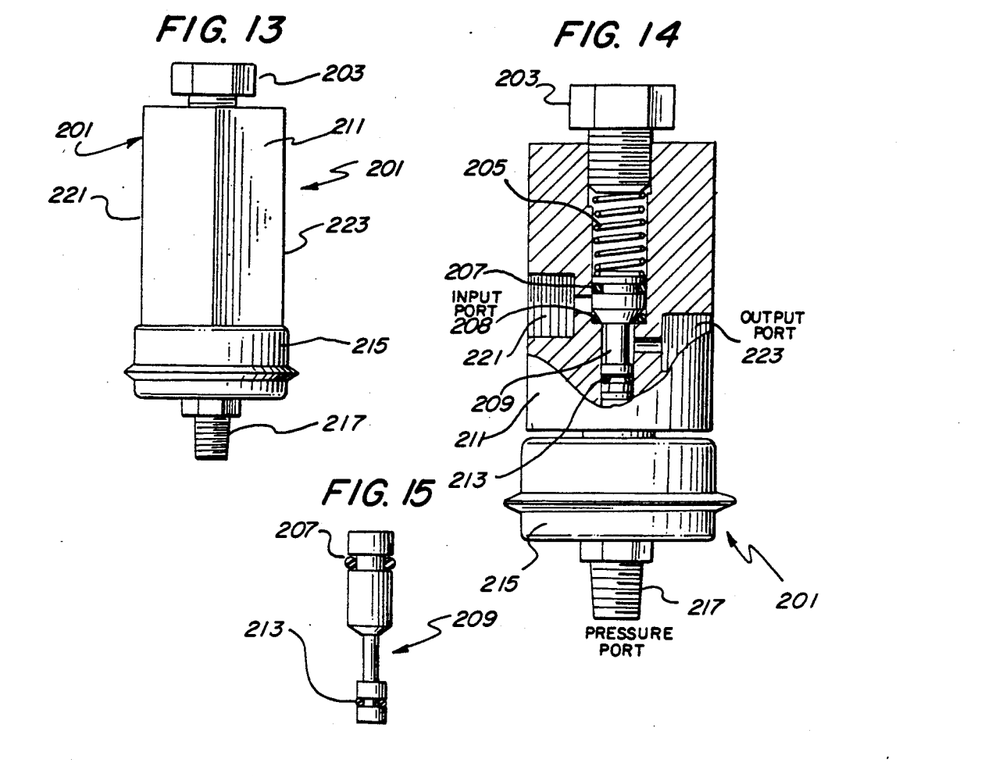
FIG. 13 is a perspective side view of an antidrain valve according to the preferred embodiment.
FIG. 14 is a partially broken away side view of the valve of FIG. 13.
FIG. 15 is a side view illustrating the shuttle of FIG. 14.

An antidrain valve 201 is shown in FIGS. 13-15. The valve 201 includes an adjusting bolt 203, a body 211, and a diaphragm 215. The body 211 internally mounts a spring 205, first and second large 0-rings 207, 208, a shuttle 207, and a small 0-ring 213. All 0-rings 207, 208, 213 are of chlorine-resistant Viton material.

The antidrain valve 201 is designed to operate or open when pressure is applied to a threaded port 217 located at the bottom of the valve 201. The pressure against the diaphragm 215 raises the shuttle 209, opening the passage between the input and output ports 221, 223, permitting chlorine gas to be drawn through the valve 201. When the pressure is withdrawn from the diaphragm 215, the spring 205 pushes the shuttle 209 back down against the 0-ring seat 208, closing the passageway between the input port 221 and the output port 223.

Figure 16:
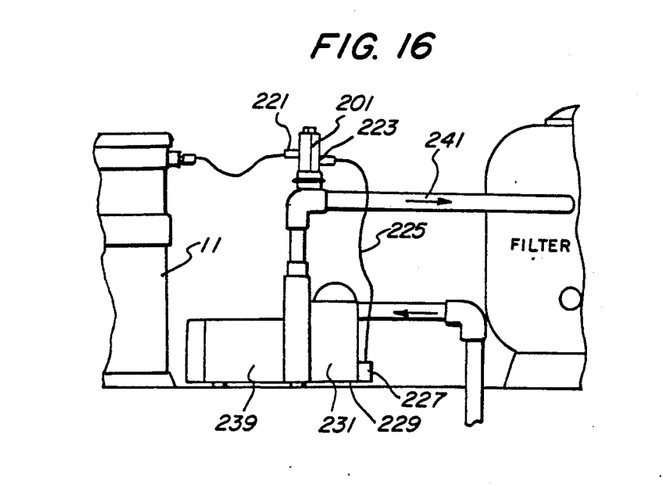
FIGS. 16 and 17 are schematic views of application of the antidrain valve and chlorinator apparatus.

As shown in FIG. 16, the output port 223 of the valve 201 is connected by a ⅜-inch-diameter tube 225 to the drain port 227 located on the bottom 229 of the swimming pool circulation pump 225, and the input port 221 is connected to the output of the chlorine generator 11. The port 217 (FIG. 13) is connected to the output side of the pump 225, for example, by directly threading into an elbow o other pipe section.

A restrictor plug 232 is inserted into the tube 225 at the drain port fitting 235 of the pump 231. The restrictor 231 has a hole size permitting a predetermined volume of chlorine gas and air mixture to flow into the circulating water system. When the pump motor 239 is operating, the pressure opens the antidrain valve 201, permitting the flow of chlorine gas into the circulating water 241. When the pump 231 is not in operation, pressure is not available to open the valve 201. In the closed position, the valve 201 will seal off the flow of chlorine gas and air to the circulating water 241. The valve seal also prevents the loss of prime of the pump 231.

Figure 17:
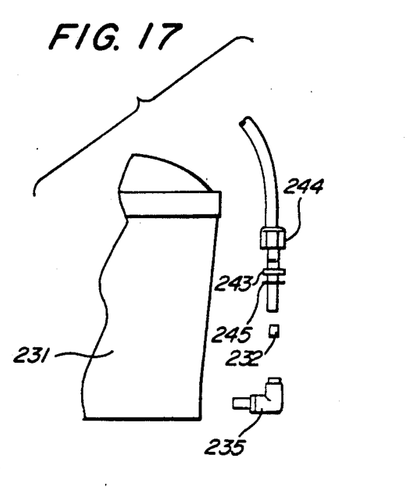

A typical installation arrangement is shown in FIG. 17, where a cap 241, retainer 243, and bushing 245 are employed to seal the line connecting restrictor 232 to the elbow body 235. The valve 201 may be located in any location in the return water line which is pressurized when the pump 231 is operating. Locating the restrictor 232 below the water level inside the pump 231 will ensure the restrictor 232 is washed and remains free of salt buildup each time the pump 231 is switched off.

Lubricant is applied in the valve 201 to lubricate the 0-rings 208, 213. At present, a Teflon-based lubricant such as Magnalube G made by Carlton-Stewart Corp., Long Island City, New York, has been used. Such lubricant breaks down after about four months due to chlorine corrosion. Use of a more highly $Cl_2$ resistant lubricant would provide a longer life.

The disclosed chlorinator is particularly suited for residential pool application. However, it may find use in various other residential, commercial, and industrial applications where chlorine generation is required, such as semiconductor manufacturing, plastics manufacturing, and various water storage or processing systems where disinfection is required.

Those skilled in the art will thus appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. Chlorinator apparatus comprising:
   a lower chamber means for containing a first liquid which initially comprises water;
   an upper chamber means slidably interfitting vertically with said lower chamber means for containing a salt solution and for isolating said salt solution from the liquid in said lower chamber means, said upper chamber means including membrane means permitting movement of sodium ions therethrough; and
   salt container means disposed in said upper chamber means.

2. The chlorinator apparatus of claim 1 wherein said upper chamber means further comprises:
   a chassis means for slidably interfitting with said lower chamber means, said chassis means including means for extending said membrane means into said lower chamber means.

3. The chlorinator apparatus of claim 2 wherein said chassis means includes a section angled in a funnel-like manner downward toward said membrane means.

4. The chlorinator apparatus of claim 3 wherein said salt container means rests within said section of said chassis means such that it may be simply lifted out thereof.

5. The chlorinator apparatus of claim 4 wherein said salt container means further comprises:
   a bottom means; and
   a funnel-like portion extending toward and attaching integrally with said bottom means.

6. The chlorinator apparatus of claim 5 wherein said bottom means comprises:
   outlet means centrally located in said bottom means; and
   means for funneling chlorine gas toward said outlet means.

7. The chlorine generator of claim 5 wherein said salt container means further includes means for initially exposing salt in the lower portion of said container means to water.

8. The chlorinator apparatus of claim 7 wherein said means for initially exposing further
   a series of generally vertical vents disposed in the lower portion of the wall of said container means.

9. The chlorinator apparatus of claim 8 wherein said chassis means further comprises means for disposing said membrane means at an angle to the horizontal.

10. The chlorinator apparatus of claim 9 wherein said upper chamber means further includes:
    a hollow upper section attached to said chassis means; and
    lid means removably interfitting with said upper section.

11. The apparatus of claim 10 further including a cathode means disposed in said lower chamber means adjacent said membrane for attracting sodium ions thereto and an anode means disposed in said upper chamber means adjacent said membrane means for attracting chlorine ions thereto.

12. The apparatus of claim 11 wherein said cathode means and anode means each include a lead means for establishing external power source connection 13. The apparatus of claim 12 further including an electrical connector means for interconnecting a said lead means to an external power lead.

14. The apparatus of claim 13 wherein said electrical connector means comprises:
    housing means for receiving said lead means, said lead means extending through said housing means;
    an electrically conductive body means for receiving said lead means and fixing said lead means therein, said body means being threadable into said housing means;
    sealing means in said housing means and responsive to threading in of said body means to seal said lead means therein; and
    means for electrically connecting an external conductor to said body means.

15. The apparatus of claim 10 wherein said lower chamber means comprises a cylindrical pipe segment, said chassis means has a generally cylindrical outer periphery, and said upper chamber means comprises a cylindrical pipe section attached to said chassis means.

16. The apparatus of claim 15 wherein said chassis means contains an annular notch for receiving the edge of said pipe segment thereby slidably and removably interfitting therewith.

17. The apparatus of claim 16 wherein said chassis means includes an upper annular notch wherein the lower edge of said upper section is rigidly fixed.

18. The apparatus of claim 1 further including antidrain valve means for connecting said chlorinator to a pump.

19. The apparatus of claim 18 wherein said antidrain valve means comprises:
an input orifice;
an output orifice; and
shuttle means responsive to pump pressure to close off the path between said input orifice and said output orifice 20. For use in chlorinator apparatus, a chassis comprising:
a generally cylindrical outer surface;
a conically-shaped surface depending from said cylindrical outer surface;
a bottom means on said conically-shaped surface having an opening therein; and
a semipermeable membrane attached across said opening.

21. The chassis of claim 20 wherein said bottom means comprises a flat bottom disposed at an angle to the horizontal.

22. The chassis of claim 20 wherein said chassis means further includes electrical connector means attached thereto, and wherein said electrical connector means comprises:
housing means for receiving a lead means, said lead means extending through said housing means;
an electrically conductive body means for receiving said lead means and fixing said lead means therein, said body means being threadable into said housing means;
sealing means in said housing means and responsive to threading in of said body means to seal said lead means therein; and
means for electrically connecting an external conductor to said body means.

23. In a chlorinator apparatus, a chassis unit comprising:
a generally cylindrical outer skirt having an annular inner edge formed at a lower end thereof and a generally circular notch formed in a top edge thereof;
a generally conical container suspended from the inner periphery of said outer skirt having a generally conical side surface formed integrally into a bottom surface, said bottom surface being disposed at an angle to the horizontal; and
a plurality of bump means formed in the inner side of said conical side surface.

24. The chassis unit of claim 23 and further including a salt basket comprising:
a generally lower conical side surface located within said generally conical container and resting on said plurality of bump means;
a bottom surface integrally formed with said lower surface, said bottom surface being generally contoured conically and decreasing in diameter in an upward direction, said conical bottom surface leading to a central opening therein for receiving a gas exhaust tube;
a plurality of elongated vents disposed in said lower conical side surface; and
an upper container surface formed integrally with said lower generally conical side surface.

25. A chlorination system comprising:
a chlorine generator means for providing chlorine;
a pump means for circulating water to and from a supply thereof; and
antidrain valve means connected to receive chlorine from said generator means and supplying it to the input side of said pump means and responsive to pressure on the output side of said pump means to shut on and off the supply of chlorine from said generator means to said input side.

26. An electrical connector comprising:
housing means for receiving said lead means, said lead means extending through said housing means;
an electrically conductive body means for receiving said lead means and fixing said lead means therein, said body means being threadable into said housing means;
sealing means in said housing means and responsive to threading in of said body means to seal said lead means therein; and
means for electrically connecting an external conductor to said body means

* * * * *